US006532055B2

United States Patent
Oishi

(10) Patent No.: US 6,532,055 B2
(45) Date of Patent: Mar. 11, 2003

(54) LIQUID CRYSTAL DISPLAY, AND METHOD FOR TRANSFERRING ITS SIGNAL, AND LIQUID CRYSTAL PANEL

(75) Inventor: Toshiya Oishi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/730,401

(22) Filed: Dec. 6, 2000

(65) Prior Publication Data
US 2001/0005254 A1 Jun. 28, 2001

(30) Foreign Application Priority Data
Dec. 22, 1999  (JP) ............................................ 11-365625

(51) Int. Cl.[7] ........................ G02F 1/1345; H03L 1/00; H03K 3/01
(52) U.S. Cl. ...................... 349/149; 349/152; 349/150; 307/264; 307/296.1; 307/268
(58) Field of Search ................................ 345/132, 103, 345/87, 96, 204, 92, 100; 349/152, 24, 41, 143, 149; 359/58, 72, 55

(56) References Cited
U.S. PATENT DOCUMENTS 6,054,975 A  * 4/2000  Kurokawa et al. .......... 345/100
6,160,605 A  * 12/2000  Murayama et al. ......... 349/149

FOREIGN PATENT DOCUMENTS

JP        2655061       5/1997
JP        9-211484      8/1997

* cited by examiner

Primary Examiner—Toan Ton
Assistant Examiner—P. R. Akkapeddi
(74) Attorney, Agent, or Firm—Young & Thompson

(57) ABSTRACT

A liquid crystal display includes a liquid crystal panel, a first gate driver substrate, a second gate driver substrate and a source driver substrate. The liquid crystal panel includes cells arrayed in matrix. The first substrate is provided in a first outer portion of the liquid crystal panel, and has a first drive circuit provided to drive a set of signal lines in an X-axis direction of the liquid crystal panel. The second substrate is provided in a second outer portion opposite to the first outer portion of the liquid crystal panel, and has a second drive circuit provided to drive another set of signal lines in the X-axis direction of the liquid crystal panel. The third substrate is provide between the first substrate and the second substrate, and has a third drive circuit provided to drive a set of signal lines in a Y-axis direction of the liquid crystal panel. Also, the third substrate includes a wiring pattern through which a signal sent to at least one of the first substrate or the second substrate is passed.

4 Claims, 5 Drawing Sheets

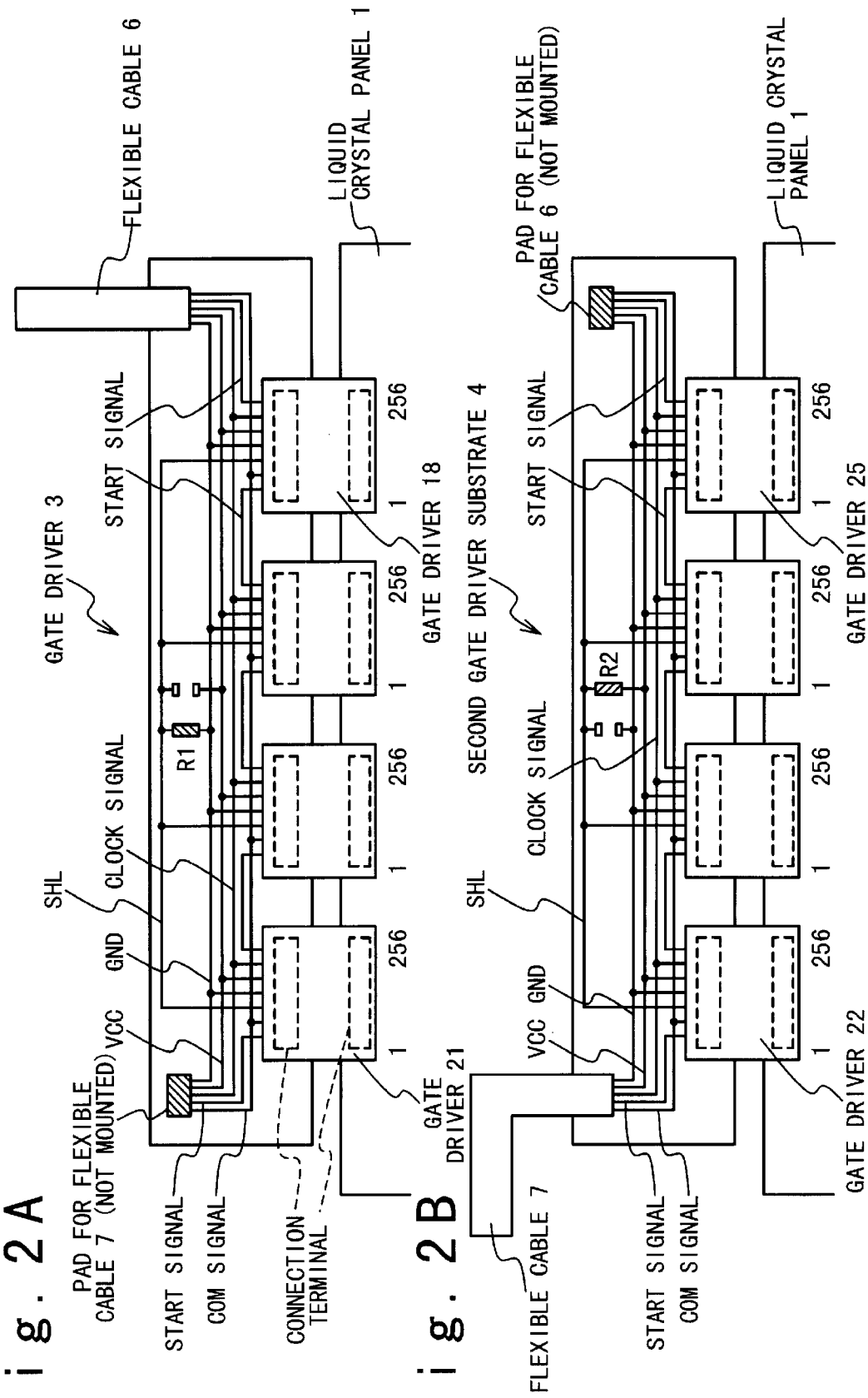

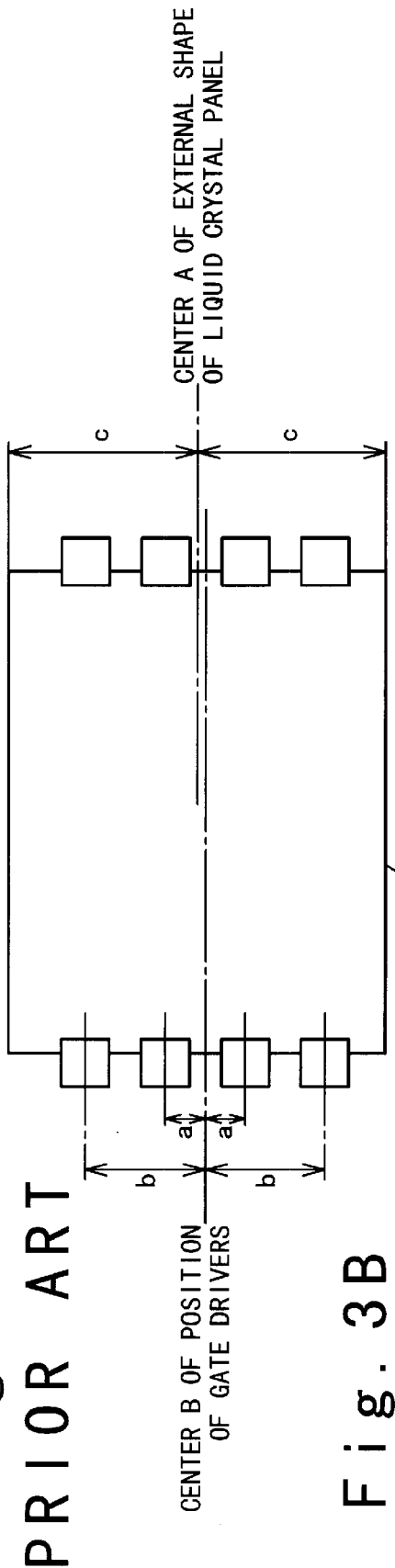
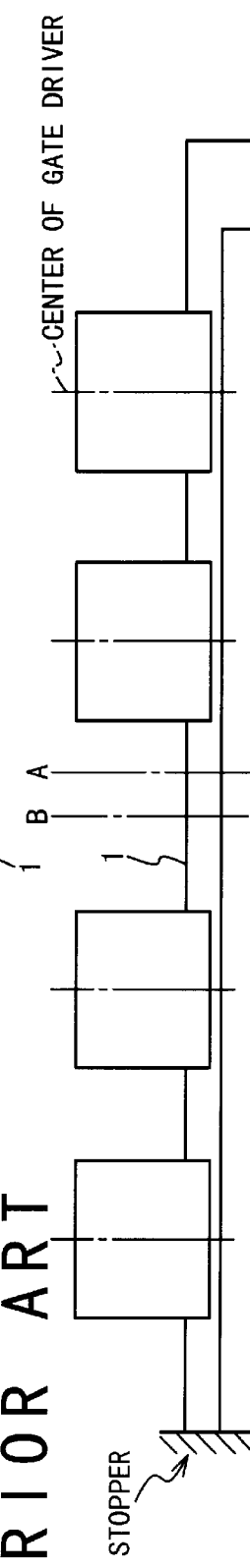
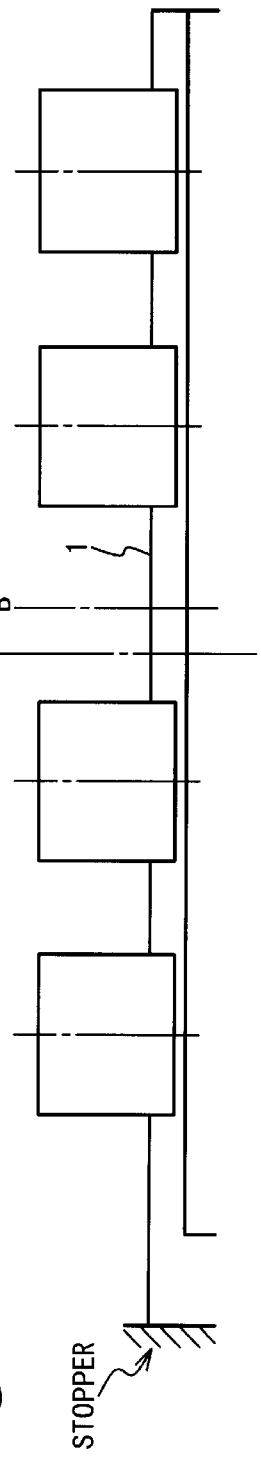
Fig. 3A PRIOR ART
Fig. 3B PRIOR ART
Fig. 3C PRIOR ART

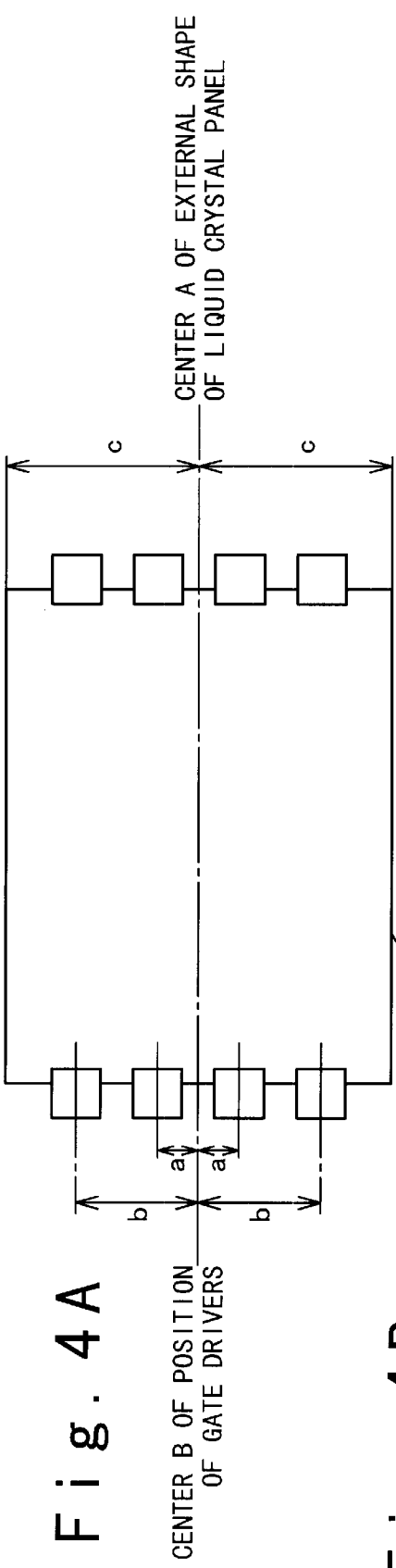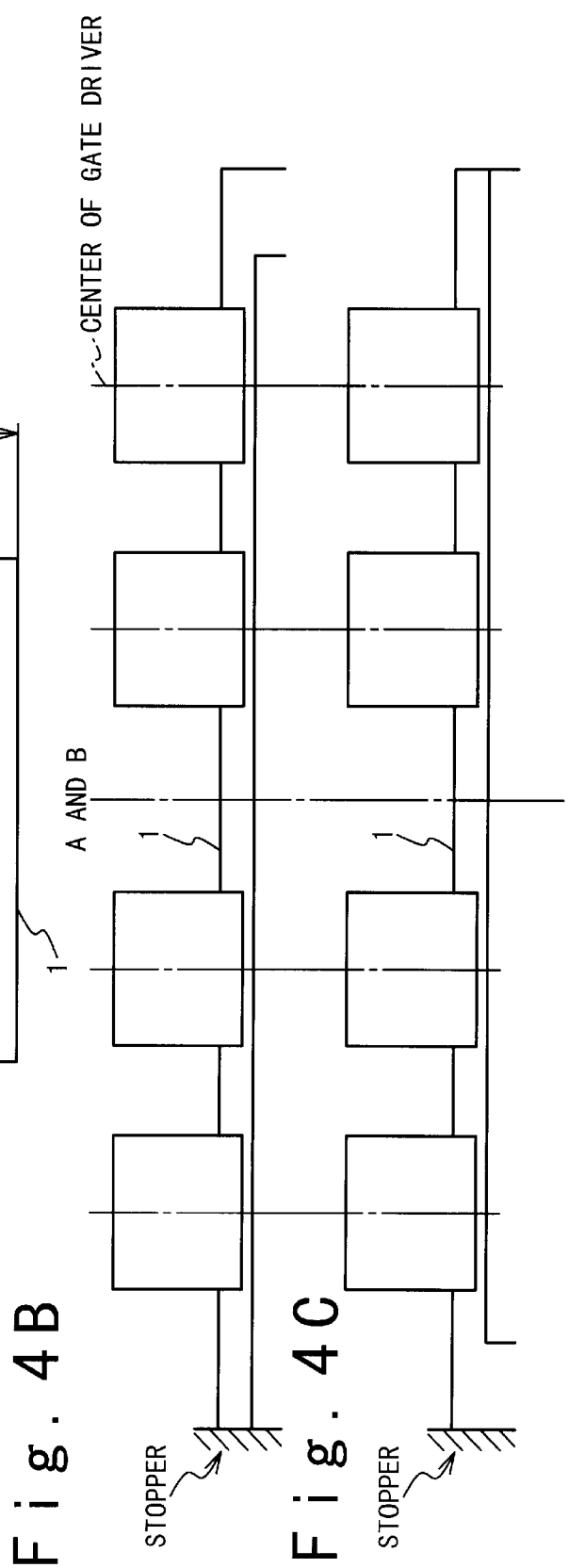
Fig. 4A
Fig. 4B
Fig. 4C

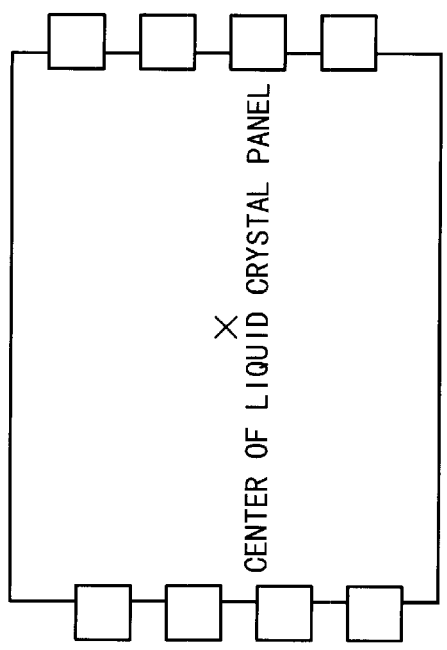
Fig. 5A
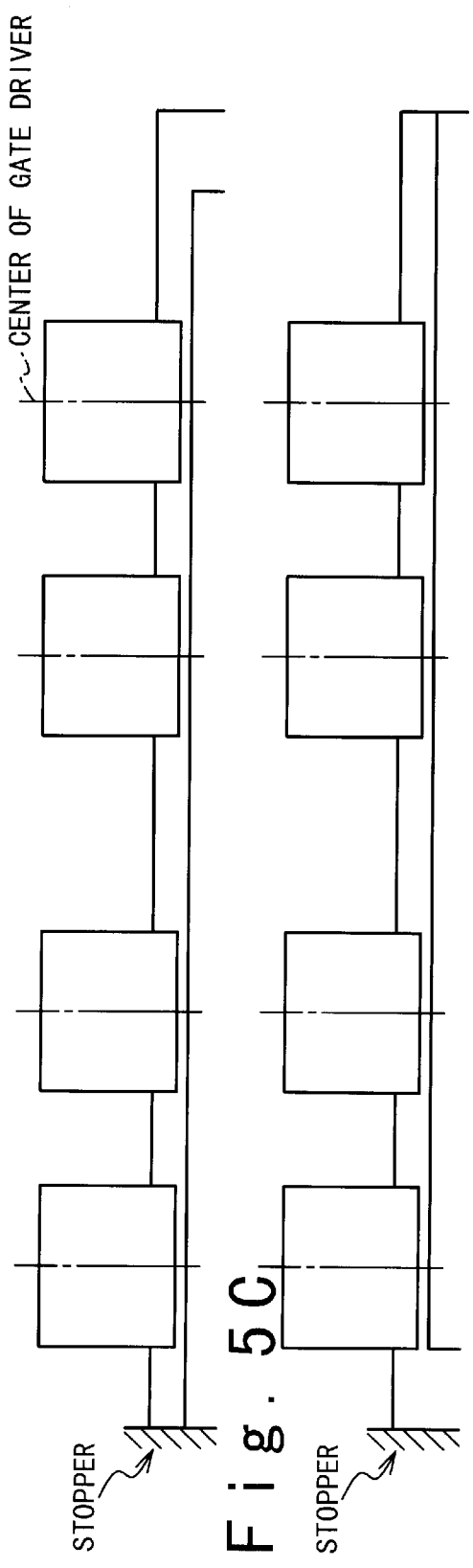
Fig. 5B
Fig. 5C

LIQUID CRYSTAL DISPLAY, AND METHOD FOR TRANSFERRING ITS SIGNAL, AND LIQUID CRYSTAL PANEL

BACKGROUND OF THE INVENTION

1. Field of the Invention

The present invention relates to a liquid crystal display, and a method for transferring its signal, and a liquid crystal panel. More particularly, the present invention relates to a technique for compactly designing a liquid crystal display and reducing its manufacturing cost.

2. Description of the Related Art

Conventionally, a liquid crystal display used as a display in a computer or the like has been well known. This liquid crystal display is composed of a liquid crystal panel and a drive circuit for driving this liquid crystal panel. The liquid crystal panel is designed such that cells are arranged in matrix at respective intersections of a plurality of signal lines in an X-axis direction and a plurality of signal lines in a Y-axis direction. The drive circuit includes a drive circuit for driving the signal lines in the X-axis direction and another drive circuit for driving the signal lines in the Y-axis direction.

The drive circuit for driving the signal lines in the X-axis direction is mounted on a substrate referred to as "gate driver substrate". This gate driver substrate is placed on any one of a left side and a right side of the liquid crystal panel. Also, the other drive circuit for driving the signal lines in the Y-axis direction is mounted on a substrate referred to as "source driver substrate". This source driver substrate is placed on any one of an upper side and a lower side of the liquid crystal panel.

As a screen of the liquid crystal panel becomes larger, the distances in the X-axis direction and the Y-axis direction increase. For this reason, a distance from a drive source to the cell becomes longer and thereby a resistance of the signal line from the drive source to the cell becomes greater. This causes a delay of a signal received by cells that are farther from the drive source. When this phenomenon occurs, a standard voltage is not supplied to an electrode of. the cell. Hence, a normal operation cannot be carried out.

Materials of the signal lines have been changed so as to reduce a resistance value. However, this increases the steps in the manufacturing process of the liquid crystal panel, making the liquid crystal display more expensive. To solve this problem and also cope with a larger size of the liquid crystal screen, the gate driver substrates have been mounted on both the left and right sides of the liquid crystal panel. In this case, the signal lines in the respective X-axis directions are driven from both the left and right sides.

However, when the gate driver substrates are mounted on both sides of the liquid crystal panel, it is necessary to extend cables to the two gate driver substrates. Thus, space for parts mounted in a periphery of the liquid crystal panel becomes limited, which brings about a problem that the liquid crystal display can not be made compact. Also, because a cable having a length that approximately crosses the liquid crystal panel in a left and right direction, the treatment of the cable is complex. Moreover, it is necessary to connect the two gate driver substrates to the liquid crystal panel. Hence, this also causes a problem that a connecting process is increased to thereby make the liquid crystal display expensive.

As a related technique, Japanese Patent No.2655061 discloses "LIQUID CRYSTAL DISPLAY" which can use one kind of a horizontal connection substrate for a first connection substrate and a second connection substrate by properly using a terminal of the horizontal connection substrate. However, this liquid crystal display is designed such that the two substrates are connected through a cable to each other. Thus, the above-mentioned problems can not be solved.

Japanese Laid Open Patent Application (3P-A-Heisei, 9-211484) disclolses "LIQUID CRYSTAL DISPLAY". In this liquid crystal display, a flexible circuit substrate connected to a first terminal electrode and a second terminal electrode placed on a liquid crystal panel is integrally formed into a single unit. The flexible circuit substrate has a rollup section for partially rolling up a portion that is not related with the connection of the first and second terminal electrodes of the flexible circuit substrate. However, this liquid crystal display does not solve the above-mentioned problems since the two substrates are connected to each other through a cable of a kind that is called a flexible circuit substrate.

SUMMARY OF THE INVENTION

The present invention has been made to solve the above-described problems, and therefore, has an object to provide a liquid crystal display, a method for transferring its signal, and a liquid crystal panel, which can be made compact and further manufactured at a low cost.

A liquid crystal display according to a first aspect of the present invention, in order to attain the above-mentioned object, includes a liquid crystal panel, a first gate driver substrate, a second gate driver substrate and a source driver substrate. The liquid crystal panel includes cells arrayed in matrix. The first substrate is provided in a first outer portion of the liquid crystal panel, and has a first drive circuit provided to drive a set of signal lines in an X-.axis direction of the liquid crystal panel. The second substrate is provided in a second outer portion opposite to the first outer portion of the liquid crystal panel, and has a second drive circuit provided to drive another set of signal lines in the X-axis direction of the liquid crystal panel. The third substrate is provide between the first substrate and the second substrate, and has a third drive circuit provided to drive a set of signal lines in a Y-axis direction of the liquid crystal panel. Also, the third substrate includes a wiring pattern through which a signal sent to at least one of the first substrate or the second substrate is passed.

This liquid crystal display according to the first aspect of the present invention may be designed such that the first substrate has the same structure as the second substrate, and the first substrate has the same wiring pattern as the second substrate. Thus, one kind of substrate can be commonly used as the first and second gate driver substrates. Hence, its manufacturing cost can be made cheaper as compared with the case when two kinds of substrates are produced.

This liquid crystal display according to the first aspect of the present invention may be designed such that the first substrate further comprises a first part whose one end is connected to the first drive circuit, and the second substrate further comprises a second part whose one end is connected to the second drive circuit. In this liquid crystal display, a predetermined potential may be applied to another end of the first part mounted on the first substrate, and another potential may be applied to another end of the second part mounted on the second substrate. In this case, the first part and the second part may be composed of resistors, respectively. According to this configuration, two kinds of functions can be attained depending on whether resistors serving as the first and second parts are connected to a power supply or a ground.

The liquid crystal panel according to the first second aspect of the present invention may be designed such that in the liquid crystal panel, a first connection terminal for connecting the first drive circuit is formed in a first inner portion of the liquid crystal panel, and a second connection terminal for connecting the second drive circuit is formed in a second inner portion opposite to the first inner portion of the liquid crystal panel, and the first connection terminal and the second connection terminal are arranged in a line symmetry with respect to a line passing through a middle point in the Y-axis direction of the liquid crystal panel.

The liquid crystal panel according to the first second aspect of the present invention may be designed such that in the liquid crystal panel, a first connection terminal for connecting the first drive circuit is formed in a first inner portion of the liquid crystal panel, and a second connection terminal for connecting the second drive circuit is formed in a second inner portion opposite to the first inner portion, and the first connection terminal and the second connection terminal are arranged in a point symmetry with respect to an intersection of a line passing through a middle point in the Y-axis direction of the liquid crystal panel and another line passing through a middle point in the X-axis direction of the liquid crystal panel.

A liquid crystal panel according to a second aspect of the present invention, for the above-mentioned similar object, includes cells, a first connection terminal, and a second connection terminal. The cells are arrayed in matrix. The first connection terminal is formed in a first inner portion of the liquid crystal panel, and connected to a first drive circuit provided to drive a set of signal lines in an X-axis direction. The second connection terminal is formed in a second inner portion opposite to the first inner portion of the liquid crystal panel, and connected to a second drive circuit provided to drive another set of signal lines in the X-axis direction. Here, the first connection terminal and the second connection terminal are arranged in a line symmetry with respect to a line passing through a middle point in an Y-axis direction of the liquid crystal panel.

The liquid crystal panel according to the second aspect of the present invention may be designed such that the first connection terminal and the second connection terminal are arranged in a point symmetry with respect to an intersection of a line passing through a middle point in an Y-axis direction of the liquid crystal panel and a line passing through a middle point in the X-axis direction of the liquid crystal panel.

A method for transferring a signal in a liquid crystal display according to a third aspect of the present invention includes providing step and transferring step. In the providing step provides a liquid crystal panel in which cells are arrayed in matrix, a first substrate which is provided in a first outer portion of the liquid crystal panel, and has a first drive circuit provided to drive a set of signal lines in an X-axis direction of the liquid crystal panel, a second substrate which is provided in a second outer portion opposite to the first outer portion of the liquid crystal panel, and has a second drive circuit provided to drive another set of signal lines in the X-axis direction of the liquid crystal panel, and a third substrate which is provide between the first substrate and the second substrate, and has a third drive circuit provided to drive a set of signal lines in a Y-axis direction of the liquid crystal panel. The transferring step transfers a signal to at lease one of the first substrate and the second substrate through a wiring pattern formed on the third substrate.

BRIEF DESCRIPTION OF THE DRAWINGS

FIG. 2A is a view showing a structure of first gate driver substrate used in the liquid crystal display according to a second embodiment of the present invention;

FIG. 2B is a view showing a structure of second gate driver substrate used in the liquid crystal display according to the second embodiment of the present invention;

FIGS. 3A to 3C are views describing a positional relation at a time of assembling the conventional liquid crystal display;

FIGS. 4A to 4C are views showing a positional relation at a time of assembling the liquid crystal display according to a third embodiment of the present invention; and FIGS. 5A to 5C are views showing a positional relation at a time of an assembling of the liquid crystal display according to a variation of a third embodiment of the present invention.

DESCRIPTION OF THE PREFERRED EMBODIMENTS

Now, embodiments of the present invention will be described below with reference to the attached drawings.

First Embodiment

Figure 1A:
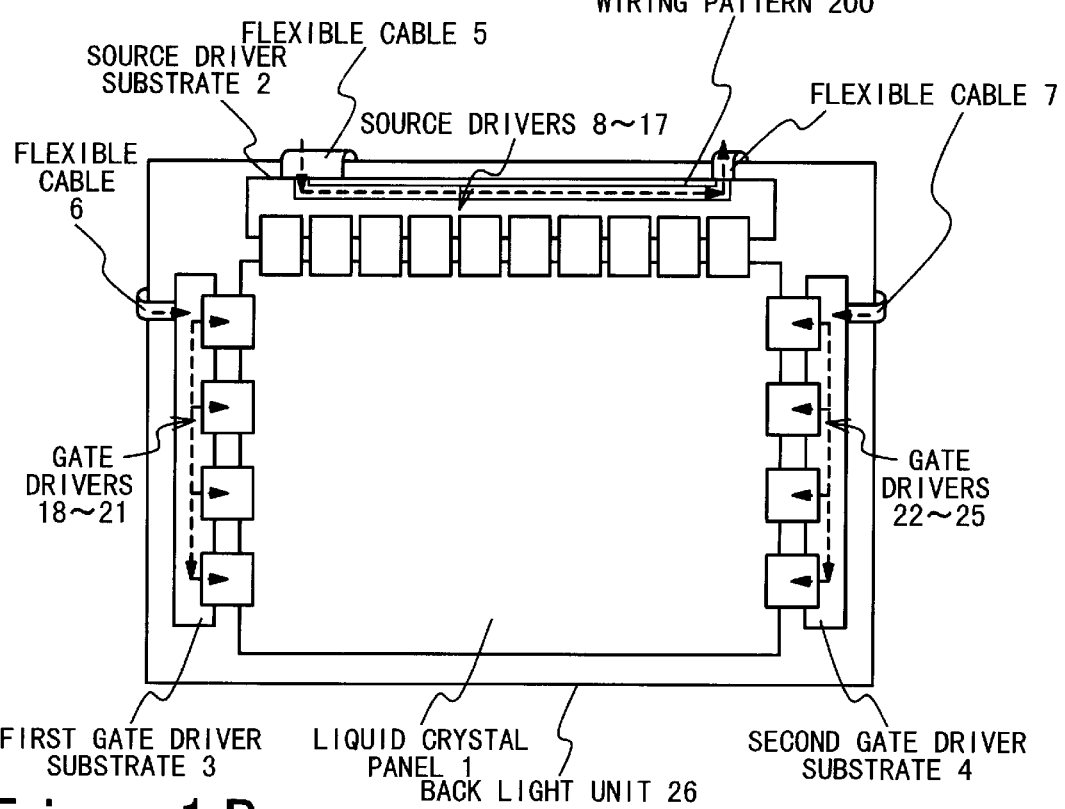
FIG. 1A is a view showing a surface appearance, in a structure of a liquid crystal display according to a first embodiment of the present invention.
Figure 1B:
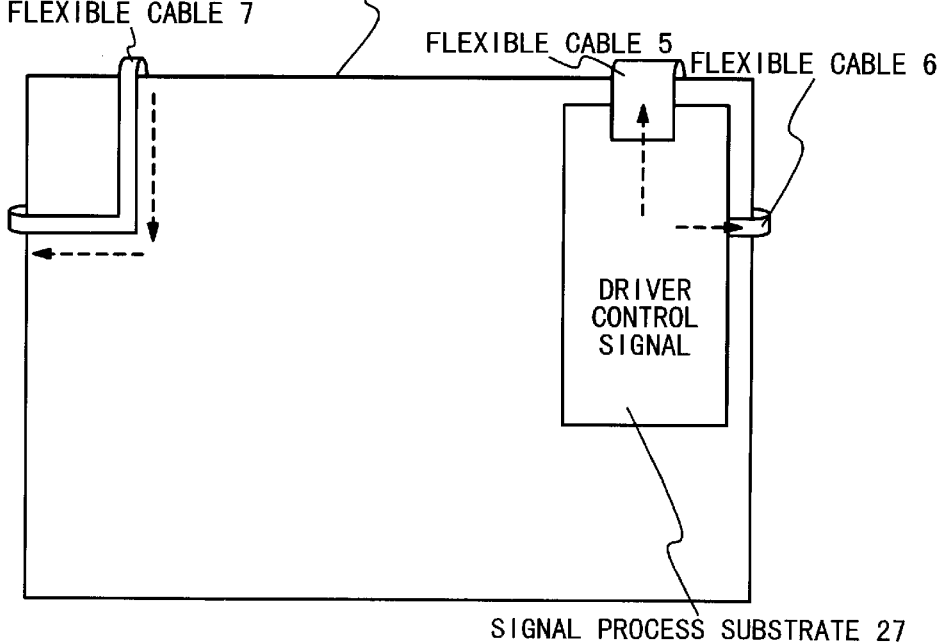
FIG. 1B is a view showing a rear appearance thereof.

A first embodiment of the present invention relates to a technique for simplifying a cabling of a liquid crystal display. Schematically, FIG. 1A shows a surface appearance of the liquid crystal display according to the first embodiment, and FIG. 1B shows a rear appearance thereof. This liquid crystal display is composed of a liquid crystal panel 1, a source driver substrate 2, a first gate driver substrate 3, a second gate driver substrate 4, flexible cables 5 to 7, source drivers 8 to 17, gate drivers 18 to 25, a backlight unit 26 and a signal process substrate 27. It should be noted that a dashed line arrow in FIGS. 1A and 1B indicates a flow of a signal.

The liquid crystal panel 1 has an approximately rectangular external shape, and it is placed on the backlight unit 26. On a center area of the surface of the liquid crystal panel 1, a plurality of signal lines (not shown) in an X-axis direction and another plurality of signal lines (not shown) in a Y-axis direction are formed. Cells constituting pixels are arrayed in matrix, at an intersection of those signal lines. Each of the plurality of signal lines in the X-axis direction is driven from a left side of FIG. 1A by the gate drivers 18 to 21 mounted on the first gate driver substrate 3. Also, each of the other plurality of signal lines in the X-axis direction is driven from a right side of FIG. 1A by the gate drivers 22 to 25 mounted on the second gate driver substrate 4.

Connection terminals connected to the source drivers 8 to 17 are formed at an upper end area on the surface of the liquid crystal panel 1, first connection terminals connected to the gate drivers 18 to 21 are formed at a left end thereof, and second connection terminals connected to the gate drivers 22 to 25 are formed at a right end thereof, respectively. However, the illustrations of all the connection terminals are omitted.

The source driver substrate 2 loads with 10 source drivers 8 to 17. The source drivers 8 to 17 are constituted by a tape carrier package (hereafter, referred to as "TCP") in which ICs are mounted on a film substrate. Driver control signals (detailed later) are inputted from the signal process substrate 27 through the flexible cable 5 to the source driver substrate 2. Accordingly, each of the source drivers 8 to 17 drives the signal line in the Y-axis direction. A part of the driver control signals is sent to the source drivers 8 to 17. It should be noted that the number of source drivers to be mounted on the source driver substrate 2 is not limited to 10. It may be an arbitrary number.

A wiring pattern 200 for connecting the flexible cable 5 and the flexible cable 7 is formed on the source driver substrate 2. Another part of the driver control signals inputted from the flexible cable 5 is outputted in its original state through the wiring pattern 200 to the flexible cable 7.

The first gate driver substrate 3 loads with four gate drivers 18 to 21. The gate drivers 18 to 21 are constituted by the TCP. The driver control signals are inputted to the first gate driver substrate 3 through the flexible cable 6 from the signal process substrate 27. These driver control signals are supplied to the gate drivers 18 to 21. Thus, each of the gate drivers 18 to 21 drives the signal line of the left half in the X-axis direction. It should be noted that the number of gate drivers mounted on the first gate driver substrate 3 is not limited to 4. It may be an arbitrary number.

The second gate driver substrate 4 loads with four gate drivers 22 to 25. The gate rivers 22 to 25 are constituted by the TCP. The driver control signals are inputted to the second gate driver substrate 4 through the flexible cable 5, the wiring pattern 200 on the source driver substrate 2 and the flexible cable 7 from the signal process substrate 27. These driver control signals are supplied to the gate drivers 22 to 25. Thus, each of the gate drivers 22 to 25 drives the signal line of the right half in the X-axis direction. Also, it should be noted that the number of gate drivers mounted on the second gate driver substrate 4 is not limited to 4. It may be an arbitrary number.

The backlight unit 26 generates a light, and irradiates the light to the rear of the liquid crystal panel 1. Thus, the brightness of the liquid crystal panel 1 is made higher. The signal process substrate 27 is fixed to a corner on the rear side of the backlight unit 26. In this signal process substrate 27, the driver control signals are generated in accordance with a control signal from a CPU (not shown). The generated driver control signals are sent to the source driver substrate 2 and the second gate driver substrate 4 through the flexible cable 5, as mentioned above, and also sent to the first gate driver substrate 3 through the flexible cable 6.

Accordingly, the source drivers 8 to 17 sequentially drive the signal lines in the Y-axis direction in order in the X-axis direction. Also, the gate drivers 18 to 21 and the gate drivers 22 to 25 sequentially drive the signal lines in the X-axis direction in order in the Y-axis direction. As a result, the respective cells in the liquid crystal panel 1 are sequentially selected, and figures and characters are displayed on a screen of the liquid crystal panel 1.

According to the first embodiment of the present invention, the liquid crystal display is designed such that the driver control signal from the signal process substrate 27 is sent through the wiring pattern 200 formed on the source driver substrate 2 to the second gate driver substrate 4. Thus, it is not necessary to lay a long cable, which substantially crosses the liquid crystal panel 1, at the rear of the backlight unit 26, in order to connect the signal process substrate 27 and the second gate driver substrate 4 to each other. Hence, the space to pull the cable around is unnecessary to thereby enable the liquid crystal display to be compactly designed.

Second Embodiment

A second embodiment of the present invention relates to a technique for commonly using the first gate driver substrate 3 and the second gate driver substrate 4.

The first gate driver substrate 3 has the same wiring pattern as the second gate driver substrate 4. They are equal to each other in a structure including an external shape. Hereafter, the first gate driver substrate 3 and the second gate driver substrate 4 in which parts are not assembled are merely referred to as a substrate. Four connection terminals to connect four gate drivers are formed on the substrate, as shown in FIGS. 2A and 2B. Also, a pad for the flexible cable 7 and a pad for the flexible cable 6 are formed at both end portions of the substrate. A ground line GND, a power supply line VCC, a clock signal line and a COM signal line are formed between both the pads, by using a wiring pattern. Wiring patterns are also formed on the substrate such that those lines are connected to the four connection terminals.

Also, a wiring pattern of a start signal line that is laid from the pad for the flexible cable 7 through each gate driver to the pad for the flexible cable 6 is formed. Moreover, predetermined pins at the respective connection terminals are commonly connected through a shift direction selection signal line SHL constituted by the wiring pattern. A VCC pad to connect with the power supply line VCC and a GND pad to connect with the ground line GND are mounted at predetermined portions of the shift direction selection signal line SHL.

When the substrate having the above-mentioned configuration is used as the first gate driver substrate 3, the gate drivers 18 to 21 are mounted as shown in FIG. 2A. Each of the gate drivers 18 to 21 can be composed of a shift register and sequentially outputs data from first to 256-th pins. A shift-in of the data to the respective gate drivers 18 to 21 and a shift-out from the respective gate drivers 18 to 21 are executed by using the start signal line. The shift direction in the gate drivers 18 to 21 is determined in accordance with a potential of the shift direction selection signal line SHL.

Also, the flexible cable 6 is mounted on the pad for the flexible cable 6, and any part is not mounted on the pad for the flexible cable 7. Moreover, a resistor R1 is mounted on the GND pad and any part is not mounted on the VCC pad. Accordingly, a signal having a low level is supplied to the shift direction selection signal line SHL. Thereby, the start signal inputted from the flexible cable 6 is shifted to a left direction of FIG. 2A on the gate drivers 18 to 21.

On the other hand, when the substrate is used as the second gate driver substrate 4, the gate drivers 22 to 25 are mounted as shown in FIG. 2B. Each of the gate drivers 22 to 25 can be composed of a shift register and sequentially outputs the data from first to 256-th pins. A shift-in of the data to the respective gate drivers 22 to 25 and a shift-out from the respective gate drivers 22 to 25 are executed by using the start signal line. The shift direction in the gate drivers 22 to 25 is determined in accordance with the potential of the shift direction selection signal line SHL.

Also, the flexible cable 7 is mounted on the pad for the flexible cable 7, and any part is not mounted on the pad for the flexible cable 6. Moreover, a resistor R2 is mounted on the VCC pad and any part is not mounted on the GND pad. Accordingly, a signal having a high level is supplied to the shift direction selection signal line SHL. Thereby, the start signal inputted from the flexible cable 7 is shifted to a right direction of FIG. 2B on the gate drivers 22 to 25.

When the first gate driver substrate 3 and the second gate driver substrate 4 having the abovementioned configuration are respectively mounted on the left and right sides of the liquid crystal panel 1 as shown in FIGS. 1A and 1B, the driver control signal outputted from the signal process substrate 27 is simultaneously supplied to the first gate driver substrate 3 and the second gate driver substrate 4, and it is sequentially shifted from the upper direction to the lower direction in FIGS. 1A and 1B. Accordingly, the scanning operation is carried out.

In the liquid crystal display according to the second embodiment, the two kinds of the gate driver substrates can be configured only by changing the mount positions of the resistors and the flexible cables on the substrate. Thus, because one substrate can be commonly used, it is possible to attain a cost drop resulting from a mass production effect. Moreover, it is enough that the wiring pattern formed on the substrate is one kind. Hence, a design time of the substrate can be shortened, and an area of the substrate can be reduced.

Third Embodiment

A third embodiment of the present invention relates to a technique for simplifying an assembling of a liquid crystal display.

In a case of assembling the liquid crystal display, when a connection between the first gate driver substrate 3 and the liquid crystal panel 1 and a connection between the second gate driver substrate 4 and the liquid crystal panel 1 are carried out, a positioning is typically carried out by butting the external shape of the liquid crystal panel 1 against a stopper. Thus, as shown in FIG. 3A, if a center A in the Y-axis direction of the liquid crystal panel 1 is different from a center B in the Y-axis direction of a position to which the gate drivers are connected, a position of the gate drivers at the time of the first gate driver substrate 3 is connected to the liquid crystal panel 1 is different from a position of the gate drivers at the time of the second gate driver substrate 4 is connected to the liquid crystal panel 1.

As shown in FIG. 3A, let us consider that the center A exists on the upper side in FIG. 3A from the center B. In this case, as shown in FIG. 3B, when the external shape of the liquid crystal panel 1 is butted against the stopper in order to connect the first gate driver substrate 3 to the liquid crystal panel 1, the position to which the gate drivers are connected is biased to the left side of FIG. 3B. On the other hand, as shown in FIG. 3C, when the external shape of the liquid crystal panel 1 is butted against the stopper in order to connect the second gate driver substrate 4 to the liquid crystal panel 1, the position to which the gate drivers are connected is biased to the right side of FIG. 3C.

Thus, when such a liquid crystal panel 1 that the center A is different from the center B is assembled, it is necessary to change the setting of an assembling facility in a case of connecting the first gate driver substrate 3 to the liquid crystal panel 1 and in a case of connecting the second gate driver substrate 4 to the liquid crystal panel 1. As a result, it takes a long time to change the setting. Also, this brings about a drop in a yield caused by the setting error.

In the liquid crystal panel 1 used in the liquid crystal display according to a third embodiment of the present invention, as shown in FIG. 4A, connection terminals for connecting the gate drivers are formed such that the center A in the Y-axis direction of the liquid crystal panel 1 coincides with the center B in the Y-axis direction of the position to which the gate drivers are connected. In other words, connection terminals for connecting the first gate driver substrate 3 and connection terminals for connecting the second gate driver substrate 4 are arranged in a line symmetry with respect to a line passing through a middle point in the Y-axis direction of the liquid crystal panel 1.

As shown in FIG. 4A, let us consider that the center A coincides with the center B. In this case, the center A when butting the external shape of the liquid crystal panel 1 against the stopper in order to connect the first gate driver substrate 3 to the liquid crystal panel 1 (refer to FIG. 4B) coincides with the center A when butting the external shape of the liquid crystal panel 1 to the stopper in order to connect the second gate driver substrate 4 to the liquid crystal panel 1 (refer to FIG. 4C).

Thus, according to this liquid crystal display, it is not necessary to change the setting of the assembling facility in the case of connecting the first gate driver substrate 3 to the liquid crystal panel 1 and in the case of connecting the second gate driver substrate 4 to the liquid crystal panel 1. As a result, it is possible to solve the problem that it takes the long time to change the setting and the problem of the drop in the yield caused by the setting error.

Also, in the liquid crystal panel 1 used in this liquid crystal display, the connection terminals for connecting the first gate driver substrate 3 and the connection terminals for connecting the second gate driver substrate 4 can be arranged in a point symmetry with respect to a center of the liquid crystal panel 1, namely, an intersection of a line passing through a middle point in the Y-axis direction of the liquid crystal panel 1 and a line passing through a middle point in the X-axis direction of the liquid crystal panel 1, as shown in FIG. 5A.

In this case, the position of the gate drivers when butting the external shape of the liquid crystal panel 1 against the stopper in order to connect the first gate driver substrate 3 to the liquid crystal panel 1 (refer to FIG. 5B) coincides with the position of the gate drivers when butting the external shape of the liquid crystal panel 1 against the stopper in order to connect the second gate driver substrate 4 to the liquid crystal panel 1 (refer to FIG. 5C). Thus, also in this case, similarly to the above-mentioned case, it is possible to solve the problem that it takes the long time to change the setting and the problem of the drop in the yield caused by the setting error.

In the first to third embodiments, the case that the gate driver substrate is divided into the gate driver substrate for the left side and the gate driver substrate for the right side is described as the example. However, a case that the source driver substrate is divided into a source driver substrate for an upper side and a source driver substrate for a lower side may be designed similarly to the abovementioned case, and it can provide an operational and effect similar to that of the above-mentioned case. Moreover, it may be designed such that the gate driver substrate is divided into the gate driver substrate for the left side and the gate driver substrate for the right side, and the source driver substrate is divided into the source driver substrate for the upper side and the source driver substrate for the lower side.

As detailed above, according to the present invention, it is possible to provide the liquid crystal display and the method for transferring its signal, and the liquid crystal panel that can be made compact and further manufactured at the low cost.

What is claimed is:

1. A liquid crystal display, comprising:

a liquid crystal panel having cells arranged in a matrix;

a first substrate adjacent to a first edge of said panel and a second substrate adjacent to a second edge of said panel opposite said first edge;

each of said first and second substrates having plural gate drivers thereon for driving respective sets of signal lines that are associated with respective ones of said cells of said panel;

each of said first and second substrates having a wiring pattern thereon that includes a ground line, a power supply line, a clock line, a control signal line, and an SHL line that carries shift direction selection signals, wherein each said wiring pattern connects said gate drivers to each other through said SHL line and connects said gate drivers to said ground, power supply, clock, and control signal lines, wherein each said wiring pattern has distal ends with respective connection pads that are. each connected to said ground, power supply, clock, and control signal lines, wherein each said wiring pattern has first terminals through which said SHL line can be connected to said ground line and second terminals through which said SHL line can be connected to said power supply line, and wherein the wiring pattern is the same for said first and second substrates;

said first substrate further comprising a first resistor that connects said first terminals to each other where said second terminals are not connected to each other in said first substrate; and said second substrate further comprising a second resistor that connects said second terminals to each other where said first terminals are not connected to each other in said second substrate.

2. The display of claim 1, wherein said first substrate further comprises a flexible cable that is connected to one of said connection pads, the other of said connection pads being unconnected.

3. The display of claim 1, wherein said plural gate drivers on said first substrate and said plural gate drivers on said second substrate are arranged in line symmetry about a line parallel to said signal lines and passing through a middle of said panel.

4. The display of claim 1, further comprising a third substrate adjacent to third edge of said panel between said first and second edges, said third substrate having plural source drivers thereon for driving respective sets of signal lines that are associated with respective ones of said cells, and wherein said third substrate has a wiring pattern thereon that is not connected to said source drivers and to which one said wiring pattern of said first and second substrates is connected.

* * * * *